(12) United States Patent
Lu

(10) Patent No.: US 8,986,597 B2
(45) Date of Patent: Mar. 24, 2015

(54) LOW CREEP REFRACTORY CERAMIC AND METHOD OF MAKING

(75) Inventor: Yanxia Lu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 506 days.

(21) Appl. No.: 11/981,097

(22) Filed: Oct. 31, 2007

(65) Prior Publication Data
US 2009/0111679 A1    Apr. 30, 2009

(51) Int. Cl.
| | |
|---|---|
| *C04B 35/49* | (2006.01) |
| *C04B 35/48* | (2006.01) |
| *B82Y 30/00* | (2011.01) |
| *C04B 35/628* | (2006.01) |
| *C03B 17/06* | (2006.01) |

(52) U.S. Cl.
CPC ............... *C04B 35/481* (2013.01); *B82Y 30/00* (2013.01); *C04B 35/62821* (2013.01); *C04B 35/62826* (2013.01); *C04B 2235/3232* (2013.01); *C04B 2235/3272* (2013.01); *C04B 2235/5436* (2013.01); *C04B 2235/5454* (2013.01); *C04B 2235/604* (2013.01); *C04B 2235/72* (2013.01); *C04B 2235/77* (2013.01); *C04B 2235/95* (2013.01); *C04B 2235/96* (2013.01); *C03B 17/064* (2013.01)
USPC ........................................................ 264/621

(58) Field of Classification Search
CPC ................. C04B 35/481; C04B 35/624; C04B 2235/3232; C04B 2235/3272; C04B 2235/3208; C04B 2235/5454; C04B 35/49
USPC ........................................................ 264/621
See application file for complete search history.

(56) References Cited

U.S. PATENT DOCUMENTS

| | | | |
|---|---|---|---|
| 3,338,696 A | 8/1967 | Dockerty | 65/145 |
| 3,437,470 A | 4/1969 | Overman | 65/195 |
| 3,682,609 A | 8/1972 | Dockerty | 65/83 |
| 3,899,341 A | 8/1975 | Schwarz | 106/57 |
| 4,804,644 A * | 2/1989 | Anseau et al. | 501/96.5 |
| 5,124,287 A | 6/1992 | Wehrenberg et al. | 501/106 |
| 5,407,873 A | 4/1995 | Goerenz et al. | |
| 6,794,786 B2 | 9/2004 | Enomoto et al. | 310/218 |
| 6,974,786 B2 * | 12/2005 | Helfinstine et al. | 501/106 |

(Continued)

FOREIGN PATENT DOCUMENTS

| | | | |
|---|---|---|---|
| JP | 11-246230 | 9/1999 | ............ C03B 17/06 |
| WO | WO 02/44102 | 6/2002 | |
| WO | WO2006/108945 | 10/2006 | ............ C04B 35/482 |
| WO | WO 2008/136968 | 11/2008 | |
| WO | WO 2009/054951 | 4/2009 | |

OTHER PUBLICATIONS

Lee et al. "Preparation of TiO2 Sol Using TiCl4 as a Precursor." Journal of Sol-Gel Science and Technology, vol. 25, Issue 2, pp. 121-136 (Sep. 2002).*

(Continued)

*Primary Examiner* — Erin Snelting
(74) *Attorney, Agent, or Firm* — Ryan T. Hardee

(57) ABSTRACT

A method is disclosed for manufacturing a zircon composition, the method comprising contacting a zircon powder with a sintering aid, wherein the sintering aid is in the form of a liquid, a sol, or a combination thereof. Also disclosed are methods for forming the zircon composition into a desired shape and for firing a composition to produce a ceramic body. The zircon composition and ceramic body produced by the described methods are also disclosed.

30 Claims, 3 Drawing Sheets

(56) References Cited

U.S. PATENT DOCUMENTS

| | | |
|---|---|---|
| 2004/0055338 A1* | 3/2004 | Helfinstine et al. ........ 65/374.13 |
| 2005/0012231 A1* | 1/2005 | Olsson et al. .................. 264/19 |
| 2005/0130830 A1 | 6/2005 | Ames et al. .................. 501/103 |
| 2007/0142207 A1 | 6/2007 | Helfinstine et al. ........... 501/106 |

OTHER PUBLICATIONS

R. Moreno, et al., "Slip Casting of Zircon. Effect of Iron Impurities on Rheology," Ceramics International, 1990, vol. 16, pp. 115-119.

R. Routschka, et al., "Feuerfeste Werkstoffe, 4. Auflage," Jul. 31, 2007, Vulkan Verlag.

* cited by examiner

LOW CREEP REFRACTORY CERAMIC AND METHOD OF MAKING

BACKGROUND OF THE INVENTION

1. Field of the Invention

The present invention relates to refractory ceramic materials and the use of such materials in the manufacture of sheet glass by the fusion process.

2. Technical Background

The fusion process is one of the basic techniques used to produce sheet glass and can produce sheet glass having surfaces with superior flatness and smoothness relative to sheet glass produced by alternative processes, such as for example, the float and slot drawn processes. As a result, the fusion process has found advantageous use in the production of the glass substrates used in the manufacture of light emitting displays, such as liquid crystal displays (LCDs).

The fusion process, specifically, the overflow downdraw fusion process, includes a supply pipe which provides molten glass to a collection trough formed in a refractory body known as an isopipe. During the overflow downdraw fusion process, molten glass passes from the supply pipe to the trough and then overflows the top of the trough on both sides, thus forming two sheets of glass that flow downward and then inward along the outer surfaces of the isopipe. The two sheets meet at the bottom or root of the isopipe, where they fuse together into a single sheet. The single sheet is then fed to drawing equipment that controls the thickness of the sheet by the rate at which the sheet is drawn away from the root. The drawing equipment is located well downstream of the root so that the single sheet has cooled and become rigid before coming into contact with the equipment.

The outer surfaces of the final glass sheet do not contact any part of the outside surface of the isopipe during any part of the process. Rather, these surfaces only see the ambient atmosphere. The inner surfaces of the two half sheets which form the final sheet do contact the isopipe, but those inner surfaces fuse together at the root of the isopipe and are thus buried in the body of the final sheet. In this way, the superior properties of the outer surfaces of the final sheet are achieved.

The dimensional stability of an isopipe during the glass forming process can affect the overall success of the manufacturing process, as well as the properties of the manufactured glass sheet. In the overflow downdraw fusion process, an isopipe can be subjected to temperatures of about 1,000° C. While exposed to these temperatures, an isopipe must support its own weight, the weight of the molten glass contained within the isopipe and overflowing its sides, and at least some tensional force that is transferred back to the isopipe through the fused glass as it is being drawn.

Commercial and market factors require a continuous increase in the size of light emitting displays and thus, the size of sheet glass. Depending on the width of the sheet glass to be produced, an isopipe can have an unsupported length of about 50 feet or more.

To withstand these demanding conditions, isopipes have conventionally been manufactured from isostatically pressed blocks of refractory material (hence the name "iso-pipe"). In particular, isostatically pressed zircon refractories have been used to form isopipes for the fusion process. Conventional zircon refractories are comprised of $ZrO_2$ and $SiO_2$, or equivalently $ZrSiO_4$, and powdered sintering additives. Even with such high performance materials, isopipe materials can creep, resulting in dimensional changes which limit their useful life. In particular, isopipes exhibit sag such that the middle of the unsupported length of the pipe drops below the height of its outer supported ends.

Thus, there is a need to address dimensional stability and other shortcomings associated with conventional isopipes and methods for manufacturing sheet glass. These needs and other needs are satisfied by the composition and methods of the present invention.

SUMMARY OF THE INVENTION

The present invention relates to a low-creep refractory ceramic material that can be used in the manufacture of sheet glass by, for example, the overflow downdraw fusion process, and specifically to an isopipe designed to control sag during use. The present invention addresses at least a portion of the problems described above through the use of a novel refractory ceramic composition and method of making.

In a first aspect, the present invention provides a method of making a ceramic composition comprising contacting a zircon powder with a sintering aid, wherein the sintering aid is in the form of a liquid, a sol, or a combination thereof.

In a second aspect, the present invention provides a mixture of zircon and a sintering aid, wherein the sintering aid is in the form of a liquid, a sol, or a combination thereof.

In a third aspect, the present invention provides an article formed from the method and mixture described above.

Additional aspects and advantages of the invention will be set forth, in part, in the detailed description, figures, and any claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain aspects of the present invention and together with the description, serve to explain, without limitation, the principles of the invention. Like numbers represent the same elements throughout the figures.

DETAILED DESCRIPTION OF THE INVENTION

Figure 1:
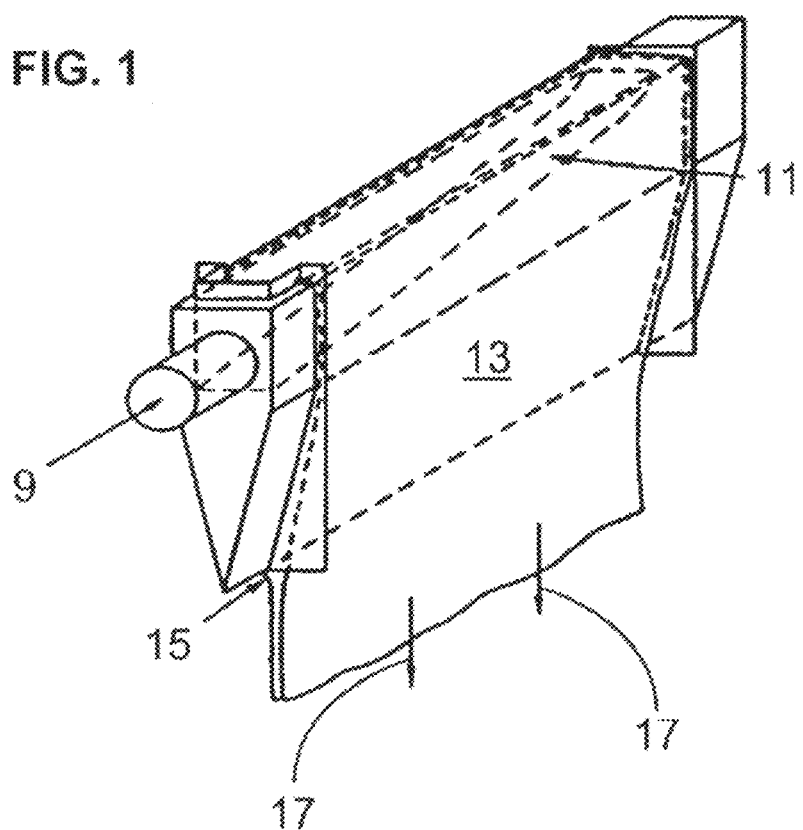
FIG. 1 is a schematic diagram illustrating a representative construction for an isopipe for use in an overflow downdraw fusion process for making sheet glass, in accordance with one aspect of the present invention.

The present invention can be understood more readily by reference to the following detailed description, drawings, examples, and claims, and their previous and following description. However, before the present compositions, articles, devices, and methods are disclosed and described, it is to be understood that this invention is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its currently known aspects. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination aspect, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "component" includes aspects having two or more such components, unless the context clearly indicates otherwise.

"Optional" or "optionally" means that the subsequently described event or circumstance can or cannot occur, and that the description includes instances where the event or circumstance occurs and instances where it does not. For example, the phrase "optional component" means that the component can or can not be present and that the description includes both aspects of the invention including and excluding the component.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, refers to the ratio of the weight of the component to the total weight of the composition in which the component is included, expressed as a percentage.

As used herein, the term "isopipe" refers to any sheet forming delivery system used in a fusion process which produces flat glass wherein at least a part of the delivery system comes into contact with the glass just prior to fusion, irrespective of the configuration or the number of components making up the delivery system.

As used herein, the term "pore" or "pores" refers to a vacancy or void within and/or between grains of a refractory material. The tern "pore" is intended to describe vacancies and/or voids of varying sizes, but is not intended to describe inter-atomic spaces within a material.

As briefly introduced above, the present invention provides methods for manufacturing an improved ceramic composition and a refractory ceramic body that, for example, can be useful as an isopipe in the manufacture of sheet glass. The isopipe of the present invention can have enhanced dimensional stability and longevity over conventional isopipes used in the manufacture of sheet glass.

Although the compositions, refractory bodies, and methods of the present invention are described below with respect to the manufacture of zircon compositions, isopipes and sheet glass, it should be understood that the same or similar compositions and methods can be used in other ceramic compositions, such as, for example, alumina and zirconia containing ceramics, and applications where dimensionally stable refractory materials are required. Accordingly, the present invention should not be construed in a limited manner.

With reference to the drawings, FIG. 1 illustrates a schematic of an isopipe, typical of those used in the manufacture of sheet glass by, for example, the overflow downdraw fusion process. A conventional isopipe and sheet glass manufacturing system comprises a supply pipe 9 that provides molten glass to a collection trough 11 formed in a refractory body 13 known as an isopipe. During operation, molten glass can flow from the supply pipe to the trough where it can overflow the top of the trough of both sides, forming two sheets of glass that flow downward and then inward along the outer surfaces of the isopipe. The two sheets meet at the bottom or root 15 of the isopipe where they can fuse together into a single sheet. The single sheet is then fed to drawing equipment (represented by arrows 17), which controls the rate at which the sheet is drawn away from the root, and thus, the thickness of the sheet. The drawing equipment is typically positioned downstream of the root such that the formed sheet glass has sufficiently cooled and become rigid before contacting the equipment.

Zircon isopipes, such as those described herein, can be comprised of preformed, commercially available zircon materials (Ferro Corporation, Penn Yan, N.Y., USA). Preformed zircon materials can be classified by particle size and one or more classifications can be mixed together to produce a zircon useful for forming an isopipe. The one or more conventional zircon materials can be formed into a desired shape, such as an isopipe, and fired, producing a polycrystalline refractory ceramic body. A challenge in the formation of such a refractory ceramic body is achieving a dense structure that is resistant to creep. Creep, as used herein, refers to the tendency of a material to move or to deform to relieve a stress. Such deformation can occur as a result of long-term exposure at, for example, high temperature, to levels of stress that are below the yield or ultimate strength of the material. Lowering the creep rate of a refractory material such as, for example, an isopipe, can result in less sag during use. Creep rate can accelerate in low density or high grain-boundary concentration refractory materials, such as those having large amounts pores located at grain boundaries and/or triple points.

Creep can occur in various forms, such as Nabarro-Herring creep (stress driven bulk diffusion within grains) and/or Cobble creep (grain-boundary diffusion). Not wishing to be bound by theory, Nabarro-Herring creep can be related to the concentration and size of pores within a grain. A reduction in the concentration and/or size of pores within grains can result in increased creep resistance. Similarly, Cobble creep can be related to mass transport phenomena occurring along grain boundaries of a polycrystalline material, and can also be inversely related to grain size, as well as more sensitive to grain size. Conventional zircon refractory ceramics comprise zircon materials having large grain sizes so as to minimize grain boundaries, and thus Cobble creep. Use of zircon materials having a larger grain size can reduce the effects of Cobble creep, but can simultaneously result in an increase in the concentration and size of pores within the refractory body due to the difficulty in sintering and/or densification.

Conventional isopipes are typically prepared using zircon materials having a particle size range of from about 0.1 µm to about 150 µm and can include substantial pores within their structure.

The present invention provides a method for making a novel ceramic composition comprising a zircon powder and a sintering aid, wherein the sintering aid is in the form of a liquid, a nanoparticle sol, or a combination thereof. While not wishing to be bound by theory, the use of a liquid and/or nanoparticle sol sintering aid can facilitate improved distribution and/or coating of the sintering aid on the powdered zircon particles. Such improved distribution can provide, for example, a ceramic article or refractory ceramic body with a low grain boundary concentration, but having uniform microstructure, low grain boundary concentration, high grain boundary strength, and a low creep rate.

Sintering Aid

The sintering aid of the present invention can be any material suitable for use as a sintering aid in a ceramic composition. In various aspects, the sintering aid can be in the form of a liquid, a nanoparticle sol, or a combination thereof. In one aspect, the sintering aid is in the form of a liquid. In a specific aspect, the sintering aid is in the form of a liquid, wherein a solute is substantially or completely dissolved in a solvent, and wherein the liquid comprises no or substantially no undissolved solids. A liquid sintering aid can comprise one or more individual sintering aids dissolved or substantially dissolved in a solvent. In one aspect, a liquid sintering aid comprises a single sintering aid dissolved in one or more solvents. In another aspect, a sintering aid comprises two individual sintering aids dissolved in one or more solvents.

In another aspect, the sintering aid is in the form of a sol, such as a nanoparticle sol. As used herein, a "sol" is intended to refer a suspension of a plurality of particles in a liquid. The size, composition, and concentration of any one or more particles in a nanoparticle sol can vary. A nanoparticle sol can also comprise, in various aspects, one or more individual sintering aid materials suspended in one or more liquids. In one aspect, a sintering aid is a nanoparticle sol comprising suspended particles having an average particle size of from about 1 to about 1,000 nm, for example, about 1, 2, 3, 5, 7, 9, 10, 20, 25, 30, 40, 50, 60, 80, 100, 150, 200, 250, 300, 400, 500, 650, 750, 800, 900, or 1,000 nm. In other aspects, a sintering aid is a nanoparticle sol comprising suspended particles having a particle size of from about 1 nm to about 200 nm, for example, about 1, 2, 3, 5, 7, 9, 10, 20, 25, 30, 40, 50, 60, 80, 100, 150, or 200 nm; from about 10 nm to about 200 nm, for example, about 10, 20, 25, 30, 40, 50, 60, 80, 100, 150, or 200 nm; or from about 20 nm to about 80 nm, for example, about 20, 25, 30, 40, 50, 60, or 80 nm. In a specific aspect, a sintering aid is a nanoparticle sol comprising suspended particles having an average particle size of about 50 nm. It should be noted that the particle size of any one or more individual sintering aid materials suspended in one or more liquids to form a nanoparticle sol can be a distributional property and that the specific distribution of particle sizes within a given sintering aid material can vary.

In other aspects, the sintering aid of the present invention can comprise a combination of one or more liquid sintering aid materials and one or more nanoparticle sol sintering aid materials.

The sintering aid of the present invention can optionally comprise other components, such as, for example a binder, stabilizer, dispersant, and/or surfactant. An optional component, if present, can comprise any material that is compatible with the ceramic and sintering aid materials. In one aspect, the sintering aid comprises a dispersant that can, for example, help maintain a suspension of particles in the sol.

An individual sintering aid material can, in various aspects, be a conventional or non-conventional sintering aid, provided that it is in the form of a liquid, a nanoparticle sol, or a combination thereof. In various aspects, an individual sintering aid can comprise a titanium containing compound, a calcium containing compound, an iron containing compound, or a combination thereof. In other aspects, an individual sintering aid is an oxide, such as, for example, a titanium oxide, a calcium oxide, an iron oxide, or a combination thereof. In a specific aspect, an individual sintering aid is a titanium dioxide. In another specific aspect, an individual sintering aid is a ferric oxide.

An individual sintering aid can also be a precursor to a conventional or non-conventional sintering aid, provided that it is in the form of a liquid, a nanoparticle sol, or a combination thereof. In one aspect, an individual sintering aid is a titanium dioxide precursor, such as, for example titanium isopropoxide ($Ti[OCH(CH_3)_2]_4$) in isopropyl alcohol. In another aspect, an individual sintering aid is a calcium oxide precursor, such as, for example, $Ca(OH)_2$, $CaCO_3$, $Ca(PH_2O_2)_3$, or a combination thereof. In yet another aspect, an individual sintering aid is a yttrium oxide precursor, such as, for example, $Y(OH)_3$, $Y(C_2H_3O_2)_3 \cdot 4H_2O$, or a combination thereof.

The sintering aid of the present invention can comprise any liquid suitable for use in preparing a ceramic composition. In one aspect, the sintering aid comprises a liquid that can dissolve all of or substantially all of an individual sintering aid disposed therein. In another aspect, the sintering aid comprises a liquid in which one or more nanoparticle materials, such as those described herein, can be suspended to form a sol. The liquid of a sintering aid can comprise one or more individual liquids that can serve the same and/or different functions, such as, for example, wetting the surface of a zircon powder, dissolving an individual sintering aid material and/or a precursor thereof, or maintaining a suspension of nanoparticle sintering aid materials. In one aspect, a sintering aid comprises water. In another aspect, a sintering aid comprises an alcohol, such as, for example, isopropyl alcohol. In yet another aspect, a sintering aid comprises a mixture of water and isopropyl alcohol.

The sintering aid of the present invention can provide one or more benefits to a ceramic composition, such as, for example, improved sintering of ceramic particles, strengthened grain boundary, or a combination thereof. Any individual sintering aid material can provide one or more of the benefits described herein. The specific benefits and magnitude thereof of an individual sintering aid material can vary, and one or more individual sintering aid materials can be selected to provide a balanced or tailored combination of benefits for a specific application. For example, a titanium dioxide sintering aid material and/or precursor thereof, can serve both sintering and/or a grain boundary strengthening functions for a zircon material. Alternatively, an iron oxide sintering material can provide improved sintering of a ceramic composition. Sintering aids and precursors thereof are commercially available. One of skill in the art could readily select an appropriate liquid and/or sol sintering aid for use with the methods of the present invention.

Ceramic Composition

The ceramic composition of the present invention can comprise a zircon powder and any one or more sintering aids as described herein. The zircon powder of the present invention can be any zircon material suitable for use in preparing, for example, a ceramic composition, a refractory ceramic body, and/or a fired ceramic body, such as an isopipe. A zircon powder can comprise at least about 95 wt. % zircon ($ZrSiO_4$) and optionally other additives and/or impurities. In one aspect, a sintering additive comprises no or substantially no species that can be harmful to, for example, a glass product in contact with an isopipe made from the ceramic composition. Such harmful species can include ions such as, for example, $Cl^{-1}$, $F^{-1}$, $P^{-1}$, $N^{-5}$, $S^{-2}$, $Na^+$, $K^+$, or a combination thereof. In a preferred aspect, a zircon powder comprises only $ZrSiO_4$. Zircon materials can be manufactured or can be purchased commercially (Ferro Corporation, Penn Yan, N.Y., USA).

In various aspects, the ceramic composition can comprise from about 90 wt. % to about 99.99 wt. % $ZrSiO_4$, for example, about 90, 91, 92, 93, 94, 95, 96, 97, 98, 99, 99.5, 99.8, 99.9, 99.95, or 99.99 wt. % $ZrSiO_4$. In other aspects, the ceramic composition can comprise less than about 90 wt. % or greater than about 99.99 wt. % $ZrSiO_4$.

The average particle size, median particle size ($D_{50}$), and distribution of particle sizes of a specific zircon powder can vary and the present invention is not intended to be limited to a particular particle size or distribution. In one aspect, the zircon powder has a $D_{50}$ of from about 2 μm to about 20 μm, for example, about 2, 2.5, 3, 3.5, 4, 4.5, 5, 5.5, 6, 6.5, 7, 7.5, 8, 8.5, 9, 9.5, 10, 12, 14, 16, 18, 19, or 20 μm; or from about 3 μm to about 10 μm, for example, about 3, 3.5, 4, 4.5, 5, 5.5, 6, 6.5, 7, 7.5, 8, 8.5, 9, 9.5, or 10 μm. In another aspect, the zircon powder has a broad distribution of particle sizes with a $D_{10}$ of about 0.3 μm and a $D_{90}$ of about 30 μm. Such a zircon powder can have a large average grain size, a low concentration of grain boundaries, and can reduce Cobble creep in a fired zircon ceramic article.

The ceramic composition of the present invention can comprise any suitable amount of one or more sintering aids, as described herein. The specific concentration of a sintering aid in a ceramic composition can vary depending upon, for example, the intended application and desired properties of, for example, a fired ceramic article. In various aspects, the ceramic composition can comprise from about 0.01 wt. % to about 1 wt. %, for example, about 0.01, 0.02, 0.03, 0.05, 0.08, 0.10, 0.12, 0.14, 0.16, 0.18, 0.20, 0.24, 0.28, 0.30, 0.35, 0.4, 0.45, 0.5, 0.6, 0.8, 0.9, or 1.0 wt. %; or from about 0.01 wt. % to about 0.5 wt. %, for example, about 0.01, 0.02, 0.03, 0.05, 0.08, 0.10, 0.12, 0.14, 0.16, 0.18, 0.20, 0.24, 0.28, 0.30, 0.35, 0.4, 0.45, or 0.5 wt. % of one or more sintering aids on a solids basis. In other aspects, a ceramic composition can comprise less than 0.01 wt. % or greater than 0.5 wt. % of one or more sintering aids. The liquid and/or sol sintering aids of the present invention can be coated and/or distributed amongst the zircon powder particles more efficiently than traditional powdered sintering aids, thus allowing reduced concentrations of sintering aids when compared to conventional methods and materials. While amounts greater than about 1 wt. % of a sintering aid can be utilized in a ceramic composition, such concentrations can, in various applications, act as an impurity and/or result in a soft ceramic article. In a preferred aspect, only an amount of sintering aid necessary to provide the desired properties of a fired ceramic article is present in the ceramic composition.

In a specific aspect, a ceramic composition can comprise about 0.5 wt. % of a titanium dioxide sintering aid, such as, for example, from a titanium containing precursor. In another specific aspect, a ceramic composition can comprise about 0.05 wt. % of a ferric oxide sintering aid.

Preparation of Zircon Isopipe Solid

The ceramic composition of the present invention can, in various aspects, be prepared by contacting and/or mixing a zircon powder with a liquid and/or sol sintering aid. In other aspects, one or more zircon powders having the same or different particle size distributions can be contacted with one or more liquid and/or sol sintering aids. The method in which the zircon powder and sintering aid are mixed can vary and can be any suitable method that can coat and/or substantially homogeneously distribute the sintering aid on the zircon powder. In one aspect, the method of contacting homogeneously distributes the sintering aid so as to provide a coating on the surface of each of the zircon powder particles. In another aspect, the method of contacting can comprise a ball milling process, wherein the zircon powder is coated with the liquid or sol sintering aid.

Figure 2:
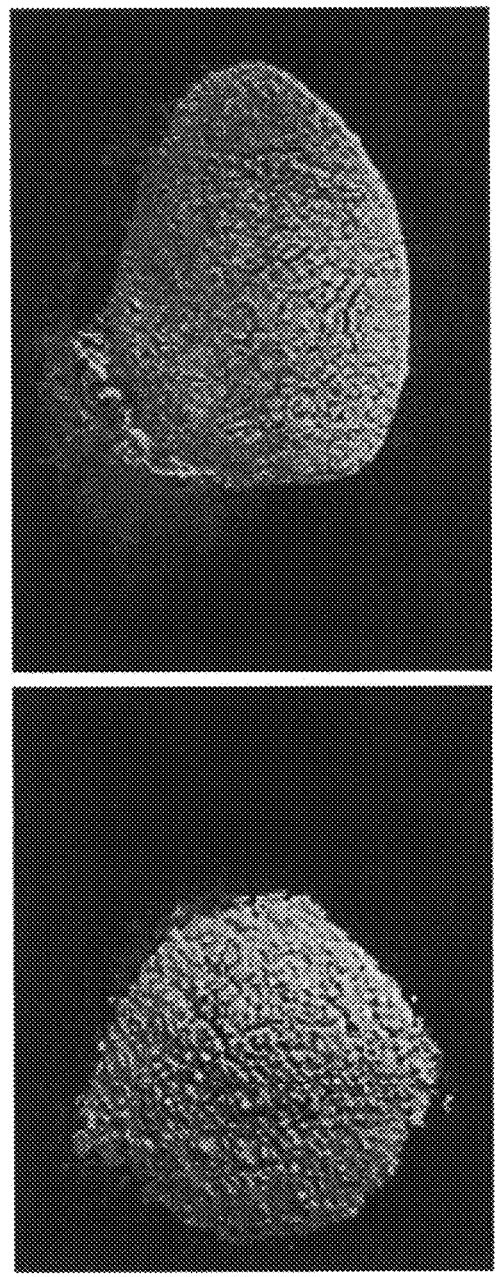
FIGS. 2A & 2B are comparative photographs of two zircon powder samples prepared from (A) isopropyl alcohol without a sintering additive, and (B) a titanium isopropoxide solution, in accordance with various aspects of the present invention.

In other aspects, the method of contacting can further comprise a spray drying process. A ceramic composition of the present invention formed by, for example, a spray drying process can exhibit improved dispersion as compared to conventional zircon materials. In one aspect, a ceramic composition prepared in accordance with the methods of the present invention from a spray drying process exhibits no visible agglomerates. FIGS. 2A & 2B depict ceramic zircon powders prepared without a sintering aid and with a liquid sintering aid, respectively. The sample prepared with a sintering aid and from a spray drying process exhibited no observable agglomerates.

A ceramic composition prepared from a spray drying process can also exhibit an increased surface area as compared to uncoated conventional zircon powders. In a specific aspect, the nitrogen surface area (BET) of a zircon powder contacted and/or coated with a titanium isopropoxide sintering aid increased from 2.09 $m^2/g$ to 2.63 $m^2/g$.

Formation of a Desired Shape

The resulting mixture of a zircon powder and a liquid and/or sol sintering aid can be formed into a green body of any desired shape, such as that of an isopipe. A green body, as used herein, comprises a formed, but unfired ceramic material. The forming step can comprise any appropriate forming technique, including those known in the refractory ceramic industry. The forming step can comprise an extrusion process, an isostatic pressing process, a slip casting process, or a combination thereof. In one aspect, the forming step is an extrusion process where the composition is extruded in the form of an isopipe bar. In another aspect, the pre-fired composition can be iso-pressed to provide a desired shape. The pre-fired composition can be subjected to a tapping and/or a vacuum step to achieve a high degree of powder compaction at ambient conditions, and then be isostatically pressed at about 18,000 psi for a period of from about 0.5 to about 5 minutes.

Thereafter, the refractory can be prepared in accordance with techniques currently known in the art or with improved techniques which may be developed in the future. The refractory can be fired to convert at least a portion of the additive precursor into a pure or substantially pure oxide and to sinter at least a portion of the zircon in the composition. A firing step can comprise heating the formed green body at a time and temperature sufficient to form a stable refractory ceramic body. In one aspect, the firing step can comprise heating a formed green body in an electrical furnace at a temperature of from about 1,400° C. to about 1,580° C. for a period of from about 1 to about 48 hours. In another aspect, the firing step can comprise heating a formed green body in an electrical furnace at a temperature of from about 1,550° C. to about 1,650° C. for a period of from about 2 to about 24 hours. Firing techniques for refractory ceramics are known and one of skill in the art would readily be able to select and perform an appropriate firing step for a refractory ceramic composition of the present invention.

Fired Refractory Ceramic Body

Figure 4:
FIG. 4 is a photomicrograph of a zircon grain boundary depicting a single layer coating of $TiO_2$, in accordance with various aspects of the present invention.
Figure 3:
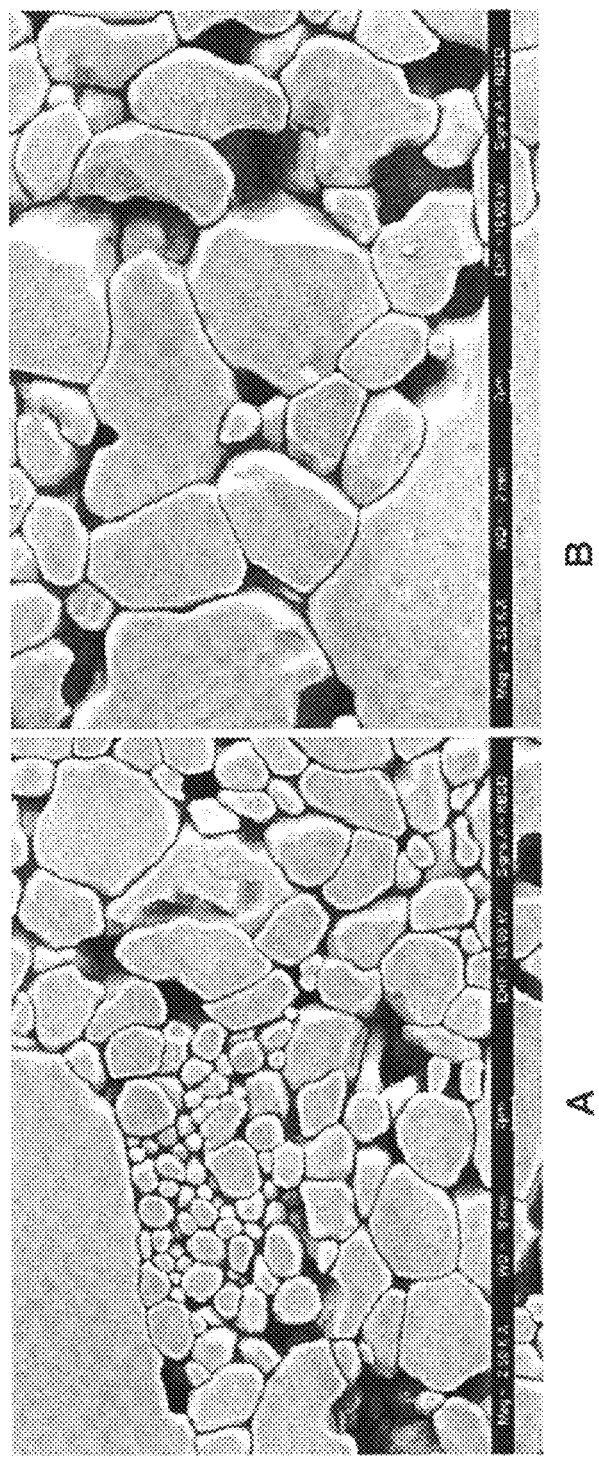
FIGS. 3A & 3B are photomicrographs of isopressed zircon bars prepared (A) without a sintering additive and (B) with a sintering additive, in accordance with various aspects of the present invention.

A ceramic article produced from such a composition can exhibit a tap density of from about 10% to about 30% greater than a comparable article prepared from an uncoated zircon powder, and a mechanical strength of more than 20% greater than a comparable article prepared from an uncoated zircon powder. In addition, such an article can exhibit a creep rate of less than about $1 \times 10^{-6}$/hr, representing a reduction of about 50% or more over conventional zircon isopipe materials. FIGS. 3A & 3B are scanning electron micrographs depicting portions of isopressed zircon ceramic articles prepared without a sintering aid, and with a $TiO_2$ sintering aid prepared in accordance with the present invention. FIG. 4 is a high resolution photomicrograph of an isopressed zircon ceramic article prepared in accordance with various aspects of the present invention illustrating a single coating layer of $TiO_2$ on zircon grains.

Although several aspects of the present invention have been illustrated in the accompanying drawings and described in the detailed description, it should be understood that the invention is not limited to the aspects disclosed, but is capable of numerous rearrangements, modifications and substitutions without departing from the spirit of the invention as set forth and defined by the following claims.

EXAMPLES

To further illustrate the principles of the present invention, the following examples are put forth so as to provide those of ordinary skill in the art with a complete disclosure and description of how the articles, devices, and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation-will be required to optimize such process conditions.

Example 1

Preparation of Zircon Isopipe Bars

In a first example, ceramic articles were prepared from the zircon compositions detailed in Table 1, below. Prior to forming, the tap density of each zircon composition was determined by tapping a powder in a graduated cylinder for 3 to 5 minutes until no further reduction of powder volume occurred. The powder was then iso-pressed at 18,000 psi for 30 to 60 seconds. The zircon ceramic was then produced by firing at 1,600° C. for 24 hours. The geometric density was measured on zircon iso-bars (3 mm by 5 mm by 160 mm bars). The mechanical strength at ambient conditions was then measured by a 4-point modulus of rupture (MOR) test. Creep rate was also determined at 1,180° C. with a 1,000 psi load, representing the second stage of creep of a material (steady creep stage).

TABLE 1

Properties of Zircon with and without additive

| Sample | Tap Density (g/cm³) | Geometric Density (g/cm³) | MOR (psi) | Creep Rate ($10^{-6}$/hr) | Coating | Comment |
|---|---|---|---|---|---|---|
| A | 1.89 | 3.859 | 17,650 | 1.78 | No | Dry mix |
| B | 2.00 | 3.837 | 18,350 | 1.74 | No | Spray dry from $H_2O$ |
| C | 2.22 | 3.924 | 18,184 | 1.26 | No | Spray dry from IPA |
| D | 2.38 | 4.101 | 21,924 | 0.73 | Yes | with $TiO_2$/IPA, spray dry from IPA |
| E | 2.33 | 3.987 | 18,151 | 0.42 | Yes | with $TiO_2$/$H_2O$, spray dry from $H_2O$ |

The zircon powder for each of the samples detailed in Table 1, above, had a $D_{50}$ of 7 μm (E-milled 7 μm zircon). Samples A, B, and C contained no additive, while samples D and E contained 0.4 wt. % of a $TiO_2$ additive. Sample A was prepared from a dry mix of zircon powder and then isopressed. Samples B and C were prepared by spray drying a zircon dispersed in either: (B) water, or (C) isopropyl alcohol (IPA). Sample D was prepared by mixing titanium isopropoxide with IPA, and sample E using an aqueous $TiO_2$ nanoparticle sol, prepared in accordance with various aspects of the present invention.

The improvement in tap density, such as, for example, from sample A to sample B, can be attributed to the spray drying process. Further, from samples B and C, to samples D and E, the differences, for example, increased densities and/or MOR, can be attributed to the use of an additive. More significantly, the creep rate of sample D was about 41% of the creep rate of a conventional zircon material (e.g., sample A).

Various modifications and variations can be made to the compositions, articles, devices, and methods described herein. Other aspects of the compositions, articles, devices, and methods described herein will be apparent from consideration of the specification and practice of the compositions, articles, devices, and methods disclosed herein. It is intended that the specification and examples be considered as exemplary.

What is claimed is:

1. A method of making a ceramic composition for use in producing a sintered ceramic body, the method comprising contacting a zircon powder with a sintering aid, wherein:
    (a) the sintering aid comprises a sol comprising a plurality of suspended $TiO_2$ nanoparticles, and
    (b) the zircon powder has an average particle size of from about 3 µm to about 10 µm.

2. The method of claim 1, wherein the suspended $TiO_2$ nanoparticles have an average particle size of from about 10 nm to about 200 nm.

3. The method of claim 1, wherein the suspended $TiO_2$ nanoparticles have an average particle size of from about 20 nm to about 80 nm.

4. The method of claim 1, wherein the sintering aid comprises at least one oxide of iron.

5. The method of claim 1, wherein the sintering aid comprises from about 0.01 wt. % to about 2 wt. %.

6. The method of claim 1, wherein the sintering aid comprises from about 0.01 wt. % to about 0.5 wt. %.

7. The method of claim 1, wherein the contacting comprises a spray drying technique.

8. The method of claim 1, wherein, after contacting, the zircon powder is substantially uniformly coated with the sintering aid.

9. The method of claim 1, further comprising, after contacting, forming the contacted zircon powder and sintering aid into a desired shape.

10. The method of claim 9, further comprising firing the desired shape at a time and temperature sufficient to form a ceramic body.

11. The method of claim 10 wherein the ceramic body has a creep rate of less than $1\times10^{-6}$/hr at 1,180° C. and 1000 psi.

12. A method of making a ceramic composition for use in producing a sintered ceramic body, the method comprising contacting a zircon powder with a sintering aid, wherein:
    (a) the sintering aid comprises titanium isopropoxide in isopropyl alcohol, and
    (b) the zircon powder has an average particle size of from about 3 µm to about 10 µm.

13. The method of claim 12, wherein the sintering aid comprises at least one oxide of iron.

14. The method of claim 12, wherein the sintering aid comprises from about 0.01 wt. % to about 2 wt. %.

15. The method of claim 12, wherein the sintering aid comprises from about 0.01 wt. % to about 0.5 wt. %.

16. The method of claim 12, wherein the contacting comprises a spray drying technique.

17. The method of claim 12, wherein, after contacting, the zircon powder is substantially uniformly coated with the sintering aid.

18. The method of claim 12, further comprising, after contacting, forming the contacted zircon powder and sintering aid into a desired shape.

19. The method of claim 18, further comprising firing the desired shape at a time and temperature sufficient to form a ceramic body.

20. The method of claim 19 wherein the ceramic body has a creep rate of less than $1\times10^{-6}$/hr at 1,180° C. and 1000 psi.

21. A method for making a ceramic body comprising:
    (a) forming a ceramic composition into a desired shape, and
    (b) firing the desired shape at a time and temperature sufficient to form a ceramic body, wherein:
        (i) the ceramic composition comprises a zircon powder which has an average particle size of from about 3 µm to about 10 µm,
        (ii) the zircon powder is coated with a sintering aid which at the time of the coating comprises a sol comprising a plurality of suspended $TiO_2$ nanoparticles, and
        (iii) the ceramic body has a creep rate of less than $1\times10^{-6}$/hr at 1,180° C. and 1000 psi.

22. The method of claim 21, wherein the forming comprises at least one of an extrusion process, an iso-press process, a slip casting process, or a combination thereof.

23. The method of claim 21, wherein the forming comprises an iso-press process.

24. The method of claim 21, wherein the desired shape comprises an isopipe.

25. The method of claim 21, wherein the firing comprises heating the desired shape at a temperature of from about 1,400° C. to about 1,650° C. for a period of from about 1 to about 48 hours.

26. A method for making a ceramic body comprising:
    (a) forming a ceramic composition into a desired shape, and
    (b) firing the desired shape at a time and temperature sufficient to form a ceramic body, wherein:
        (i) the ceramic composition comprises a zircon powder which has an average particle size of from about 3 µm to about 10 µm,
        (ii) the zircon powder is coated with a sintering aid which at the time of the coating comprises titanium isopropoxide in isopropyl alcohol, and
        (iii) the ceramic body has a creep rate of less than $1\times10^{-6}$/hr at 1,180° C. and 1000 psi.

27. The method of claim 26, wherein the forming comprises at least one of an extrusion process, an iso-press process, a slip casting process, or a combination thereof.

28. The method of claim 26, wherein the forming comprises an iso-press process.

29. The method of claim 26, wherein the desired shape comprises an isopipe.

30. The method of claim 26, wherein the firing comprises heating the desired shape at a temperature of from about 1,400° C. to about 1,650° C. for a period of from about 1 to about 48 hours.

* * * * *